Jan. 16, 1968  K. V. KORDESCH  3,364,071
FUEL CELL WITH CAPILLARY SUPPLY MEANS
Filed April 10, 1963
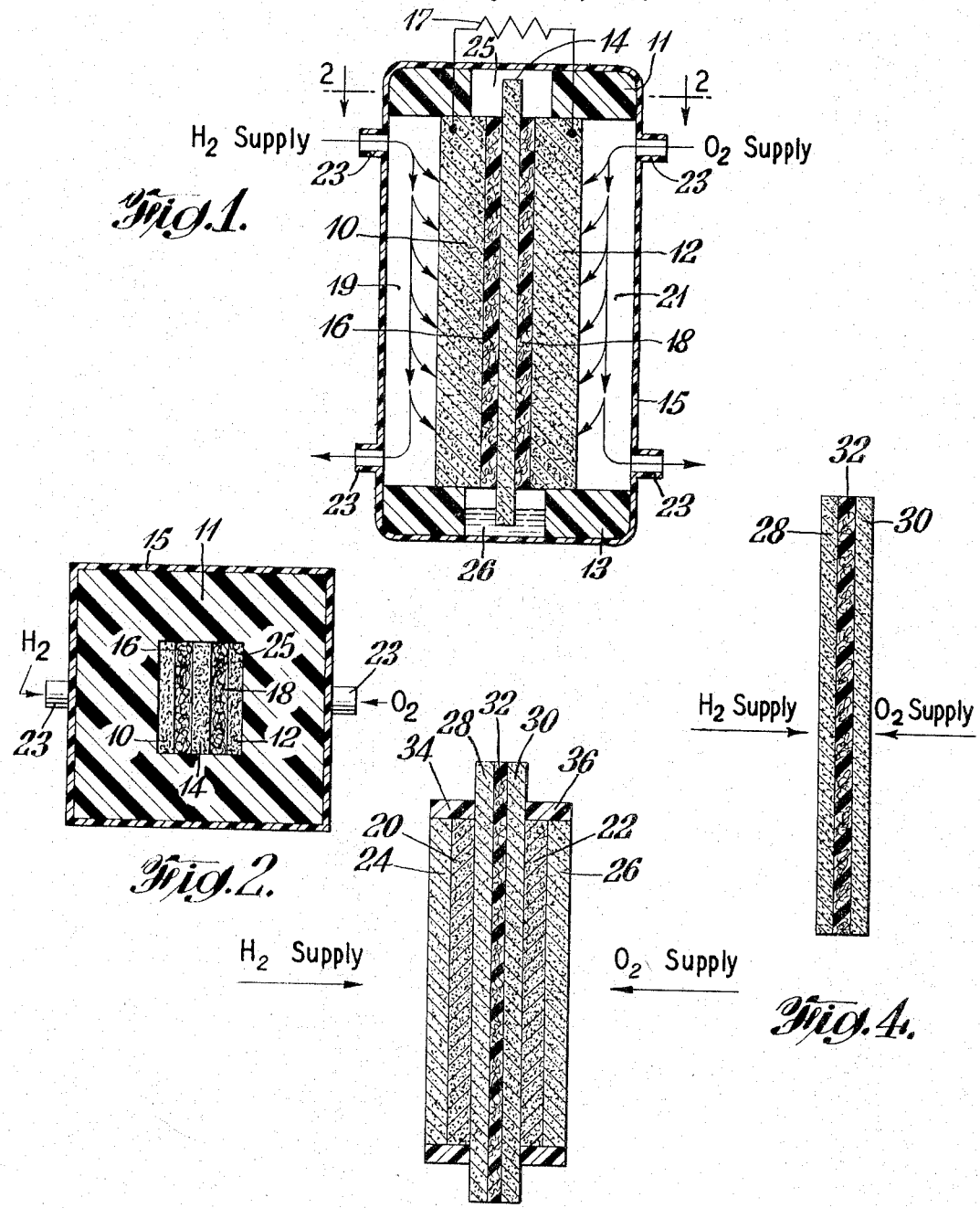
INVENTOR.
KARL V. KORDESCH
BY
ATTORNEY 3,364,071
FUEL CELL WITH CAPILLARY SUPPLY MEANS
Karl V. Kordesch, Lakewood, Ohio, assignor to Union
Carbide Corporation, a corporation of New York
Filed Apr. 10, 1963, Ser. No. 272,102
13 Claims. (Cl. 136—86)

This invention relates generally to fuel cells and, more particularly, to an improved fuel cell construction.

A fuel cell may be considered as a primary galvanic cell, the basic reaction of which is the electrochemical oxidation of a fuel. Fuel cells, however, differ from ordinary primary cells, such as the Leclanché dry cell in that the fuel and oxidant are generally introduced continuously into the cell electrodes during production of electricity. In fuel cells, the electrodes and the electrolyte theoretically maintain a constant value while the fuel and oxidant react electrochemically and the electricity and reaction product are removed from the cell.

Many kinds of fuels and oxidants have been proposed in the past, and each is accompanied with its own particular problems. In those cells using a gas as the fuel or oxidant, gas cross-leakage has been one of the more serious problems. This is the phenomenon in which gas from one electrode bridges over and contacts the other electrode instead of being ionically transported through the electrolyte. The result is a chemical short circuit which not only severely limits the ability of the cell to produce current, but also can cause irreparable damage to the electrodes. Because of this problem of "gas shorting," it has been necessary in most cases to implement at least one of several safeguards. For example, gas bubbling can be controlled by carefully regulating the pore size of the electrode, but this requires great care and often considerable expense in their manufacture. Precise control of gas pressure can also be employed, but this requires auxiliary equipment which can detract from the utility of the cell from the standpoint of size and weight considerations. Gas barriers employing mats or layers of cellulosic or ceramic material may also be used to prevent gas shorting, but these materials are often chemically or physically unstable and may inhibit the flow of ions between the electrodes.

Another construction problem encountered in fuel cells employing liquid electrolytes is that of keeping the electrolyte gap as thin as possible without permitting physical contact between any portions of the electrodes. Mechanical construction limitations generally place a minimum of about $\frac{1}{16}$ inch on this gap, and it is not always possible to construct and maintain such a thin gap.

Other problems commonly encountered in various fuel cells are the necessity of employing forced electrolyte circulation to prevent the formation of stagnant areas, the removal of heat from the electrolyte, the relatively high internal resistance and low capacitance of the cell, the necessity for wetproofing of the cell electrodes, and the escape of electrolyte in cases of electrode breakage.

It is, therefore, the main object of the present invention to provide an improved fuel cell which eliminates gas cross-leakage.

It is another object of the invention to provide an improved fuel cell construction which makes possible extremely thin electrolyte gaps.

It is still another object of the invention to provide such a cell which facilitates the removal of heat from the electrolyte.

It is a further object to provide an improved fuel cell construction which reduces the internal resistance of the cell.

A still further object is to provide such a cell which has a relatively high internal capacitance.

Another object is to provide such a cell which reduces the amount of electrode wetproofing required.

A further object is to provide such a cell which prevents the formation of stagnant areas in the electrolyte.

A still further object is to provide a fuel cell construction which prevents the escape of electrolyte in case of electrode breakage.

Other aims and advantages of the invention will be apparent from the following description and appended claims.

In the drawings:

FIG. 1 is a vertical section of a preferred embodiment of the invention wherein all the internal components of the cell are in the form of rectangular plates;

FIG. 2 is a plan view of the cell of FIG. 1;

FIG. 3 is a vertical section of the internal structure of a modified cell embodying the invention; and FIG. 4 is a vertical section of the internal structure of another modified embodiment of the invention.

In accordance with the present invention, there is provided a fuel cell having an electrolyte; two electrodes in contact with the electrolyte for electrochemically reacting a fuel and an oxidant; and a porous, gas-impermeable, ion-permeable, conductive separator-reservoir member disposed between the electrodes, the member being electronically insulated from at least one of the electrodes and being filled with the electrolyte.

The invention will be described in more detail by referring to the preferred embodiments shown in the drawings.

The fuel cell shown in FIGS. 1 and 2 comprises two spaced apart porous electrodes 10 and 12 having opposed surfaces; two adsorbent nonconductive fibrous separators 16 and 18, each of which engages one of the opposed electrode surfaces; and a porous, gas-impermeable, ion-permeable, conductive separator-reservoir member 14 disposed between and in contact with the separators 16 and 18. In the particular embodiment illustrated, the two electrodes 10 and 12, the two nonconductive separators 16 and 18, and the separator-reservoir member 14 are all in the form of flat plates, although any other suitable geometry could be employed. A pair of apertured retaining members 11 and 13, made of a suitable plastic or other insulating and electrolyte-resistant material, are mounted on the ends of the electrodes 10 and 12 with the retaining members 11 and 13 overlapping the outside edges of the electrodes 10 and 12. The retaining members and the other cell components are all enclosed in a plastic container 15 which covers the apertures in the retaining members 11 and 13 and forms gas chambers 19 and 21 adjacent the outer surfaces of the electrodes. The container 15 is provided with openings 23 to permit the passage of gases through the chambers 19 and 21.

When the apertures in the retaining members 11 and 13 are covered by the container, they form electrolyte cavities 25 and 26 adjacent the ends of the separator-reservoir member 14 and the non-conductive separators 16 and 18. As shown in FIG. 1, the lower cavity 26 is filled with electrolyte which is wicked up into the member 14 and the separators 16 and 18. The member 14 should be sufficiently long to protrude down into the cavity so that it is always in contact with the liquid electrolyte therein. It is preferred to provide electrolyte cavities at both ends of the cell, as shown, so that the cell can be operated in any desired position.

Both the nonconductive separators 16 and 18 and the conductive member 14 are soaked with a liquid electrolyte, thereby providing an ionically conductive path between the two electrodes. The two electrodes are also externally connected through a load circuit 17. The electrode 10 is supplied with a gaseous fuel, such as hydrogen, and the electrode 12 is supplied with a gaseous oxidant, such as oxygen. With hydrogen and oxygen as the fuel and oxidant, respectively, the electrolyte is suitably composed of an aqueous solution of potassium hydroxide. With hydrogen and chlorine as the fuel and oxidant, an aqueous solution of hydrochloric acid is preferred as the electrolyte.

The electrodes 10 and 12 may be made of any suitable material which is sufficiently inert in the cell environment, which is reasonably electrically conductive, and which provides a support on which the electrochemical reactions can occur. It has been found that carbon fits these requirements very well, although nickel and other materials will also suffice. Moreover, the electrodes may have catalysts, such as the platinum metals, iron, nickel, and spinels, deposited thereon for promoting the electrochemical reactions. The electrodes 10 and 12 must also be gas permeable in order to permit the gas to reach the area where the electrode and electrolyte meet, but the electrodes must not be so porous that the electrolyte readily passes therethrough. Porosities of 30 to 35 percent have been found to be desirable. Of course, the exact porosity and pore size required in any given cell depends somewhat on the particular fuel and oxidant employed, the type of electrodes and electrolyte employed, and the particular operating conditions, such as temperatures and pressures. The porous electrodes may be made by sintering particulate materials together, or by any other processes known in the art, e.g., molding or extruding carbon.

The separators 16 and 18 are made of electrolyte-resistant, liquid-absorbent, nonconductive material such as felted or woven nylon or other fabric structures. Since the main purpose of the separators 16 and 18 is to electronically insulate the separator-reservoir member 14 from the electrodes 10 and 12, the thickness of the separators is not critical. Of course, it is preferred to have the separators 16 and 18 as thin as possible in order to minimize the internal resistance of the cells. The pore size in the separators 16 and 18 should be sufficiently large to permit the free flow of ions therethrough, and it is not necessary for the separator material to be gas-impermeable.

The separator-reservoir member 14 must have an interconnecting pore or capillary structure which is ion-permeable and gas-impermeable. The interconnecting cell structure is essential for good wicking action to distribute the liquid electrolyte throughout the member 14. The porosity of the separator-reservoir member 14 should be between about 30 percent and about 80 percent. Porosities of less than 30 percent usually inhibit the iron flow, while porosities above 80 percent are generally too high for good mechanical strength. Porosities of between about 60 percent and about 70 percent are preferred. The pore size in the member 14 should be between about 0.1 micron and about 10 microns. Above 10 microns, the member becomes gas-permeable, while below 0.1 micron, an insufficient number of ions can pass through the member. The member 14 should be as thin as possible consistent with good mechanical strength in order to minimize the internal resistance of the cell, and thicknesses of $\frac{1}{16}$ inch and less have been found to be suitable. However, the thickness of the member 14 is otherwise not critical.

The construction material for the separator-reservoir member 14 must be electrically and thermally conductive and resistant to the particular electrolyte employed. Preferred construction materials are graphite, nickel, and stainless steel. These materials are good conductors and are resistant to most electrolytes. The separator-reservoir member is preferably in the form of a coherent structure which is somewhat flexible, such as a fibrous metal mat.

The separator-reservoir member may be made by any process which produces a structurally coherent member with the desired porosity. For example, suitable carbon separator-reservoir members may be made by conventional high pressure molding or extruding processes. Suitable nickel members may be made by sintering and pressing nickel power or by depositing nickel on a removable fibrous substrate by the thermal decomposition of nickel carbonyl. These and other processes for producing structurally coherent members with desired prosity are well known in the art.

The liquid electrolyte is held in the separators 16 and 18 and the member 14 by capillary forces, and may be supplied from either the top or bottom of the separator-reservoir member. Since capillary forces are much stronger than gravitational forces, the liquid electrolyte soaks into and spreads rapidly throughout the interconnecting pore structure of the member 14 and the absorbent separators 16 and 18. This capillary action assures a fresh supply of electrolyte to the active electrode surfaces at all times without a means of forced circulation, provided, of course, that water removal by evaporation is maintained continuously. Moreover, the relatively rigid nature of the conductive member 14 prevents the electrolyte from being squeezed out, as can occur with a more resilient material.

The electrodes 10 and 12, the separator-reservoir member 14, and the separators 16 and 18 are assembled by simply pressing them together under a pressure of several pounds per square inch and then holding them in that position by means of a suitable casing or container 15. Sufficient electrolyte is available at the active electrode surfaces through the wetted separators 16 and 18 to maintain the cell reaction, and yet there is little chance of the liquid electrolyte being drawn into the pores of the electrodes.

The internal structure of a modified embodiment of a liquid electrolyte cell employing the present invention is shown in FIG. 3. This cell comprises two spaced apart electrodes 20 and 22 having opposed surfaces, two porous conductive catalyst supports 24 and 26 on the outer surfaces of the electrodes, two conductive separator-reservoir members 28 and 30 in contact with the opposed inner surfaces of the electrodes, and an absorbent non-conductive separator 32 between the two members 28 and 30. A pair of insulating gaskets 34 and 36 are provided to position and support the electrode structure. The cell is completed by providing end retaining members and an outside container as shown in FIG. 1.

The cell of FIG. 3 is similar to the cell of FIG. 1 except that two conductive separator-reservoir members are employed, each of which is in contact with one electrode and electronically insulated from the other electrode by a single non-conductive separator. If desired, the catalyst could be applied to the outer faces of the conductive members 28 and 30 and these members also used as electrodes, as shown in FIG. 4. This eliminates the need for the catalyst supports 24 and 26 and the gaskets 34 and 36.

Since the separator-reservoir member between the electrode is gas-impermeable, it prevents gas cross-linkage without the need for precise control of gas pressure or electrode pore size. Fuel and oxidant gases can be supplied under pressure, even to the extent of permitting gas bubbles to form on the electrolyte sides of the electrodes. Such bubble formation, which might be caused by slightly imperfect electrodes, is harmless. Even if there is a sudden change in gas pressure at either electrode, there is no gas shorting across the electrolyte-filled separator-reservoir member. Also, since the gases cannot travel through the separator-reservoir member, they cannot chemically recombine, and excess gas can be recycled in order to raise the overall efficiency of the fuel cell. Moreover, current can be applied to such a cell and it can be used as an electrolyzer; the gases formed and discharged at the anode and cathode are physically separated by the separator-reservoir member and can be collected for storage.

The porous conductive separator-reservoir member is both physically and chemically stable and provides a simple and efficient means for removing heat from the electrolyte. Since the member is ion permeable, it also maintains a high ionic mobility in the cell.

In the preferred embodiment of the present invention, the electrolyte is contained in at least one conductive separator-reservoir member and at least one non-conductive absorbent separator. Sufficient electrolyte is available at the active electrode surface through the conductive and non-conductive separators to maintain the cell reactions, and yet there is very little danger of the electrolyte being drawn into the pores of the electrodes because of the relatively small amount of electrolyte actually in contact with the electrodes. Operation under these semi-wet conditions permits construction of the electrodes with a minimum of wetproofing material and permits the use of relatively porous electrodes. In the case of electrodes having a fairly uniform pore size, such as metal or graphite electrodes, this construction usually permits the wetproofing to be eliminated altogether. Highly porous materials which are not suitable for operation as gas diffusion electrodes in the conventional manner (i.e., immersed in the liquid electrolyte) have been found to operate very successfully under these semi-wet conditions. For example, a porous graphite electrode (80 percent porosity, 30 to 50 microns pore size) with a layer of active carbon on its surface, without wetproofing, was able to deliver only 10 amps./ft.$^2$ when immersed in a liquid electrolyte. In contrast, when the same electrode was operated under the semi-wet conditions in the device of FIG. 1, it was able to deliver as much as 1000 to 4000 amps./ft.$^2$. Similar results have been obtained with porous nickel substrates carrying an active carbon layer.

The outstanding ability of the reservoir-separator members of this invention to retain liquid electrolyte in their pores provides a solution to one of the most troublesome problems encountered with the use of very thin electrodes. Even when such extremely thin electrodes are highly liquid repellent, they tend to permit leaking of liquid electrolyte through the electrode into the gas manifold space over long periods of operation. This difficulty is eliminated when the reservoir-separator member is employed between the thin electrodes, thereby eliminating any hydrostatic pressure on the electrodes. Considerably longer life can be obtained from such cells than has been possible heretofore. For example, one such cell was operated for over 3000 hours at a current density of 15 amps./ft.$^2$ and a terminal voltage of 0.87 volt. In a parallel experiment without the separator-reservoir member, leakage occurred in less than 100 hours. Moreover, this extremely long period of operation was achieved without forced electrolyte circulation.

To further illustrate the advantages of the present cell from the standpoint of leakage, a small cell was constructed without any frame or container so that it was generally open to the atmosphere. The only electrolyte available was present in a small container underneath the cell, and the cell was supported so that only the lower end of the porous nickel reservoir-separator member was immersed in the liquid electrolyte. In a few minutes, enough electrolyte was soaked into the porous member to permit the cell to operate, and no leakage was observed even though large portions of the cell were open to the atmosphere.

Cells constructed according to this invention also have a relatively high current-carrying ability, as illustrated by the following example. A small hydrogen-oxygen cell was constructed using two thin plastic-bonded carbon electrodes, a woven nylon separator 3 to 4 mils thick on each of the opposed electrode surfaces, and a 1/16-inch thick porous nickel plaque (70 percent porosity) between the two nylon separators, as shown in FIG. 1. The nickel plaque and the nylon separators were soaked with potassium hydroxide, and the various elements were mounted in a casing which pressed them together under several pounds of pressure. At 50° C., this small cell surprisingly delivered current densities as high as 400 amps./ft.$^2$ at 0.82 volt, in spite of the very small amount of electrolyte present in the nickel plaque. This same cell was able to operate continuously at 100 amps./ft.$^2$ with no additions or changes of electrolyte. The water produced was vaporized into the gas stream.

Fuel cells constructed according to the subject invention are substantially smaller in overall size than known prior art cells. As an illustration of this feature of the invention, a small cell equipped with an electrolyte-soaked nickel plaque and having electrode areas of about 2 cm.$^2$ and operating at 200 amps./ft.$^2$ produced the same power output as another cell employing ion exchange membranes and having electrode areas of 20 cm.$^2$ and operating at 20 amps./ft.$^2$. The cell voltage in each case was 0.82 volt.

Another significant advantage of this invention is realized in devices in which the direct current from the fuel cell is converted to alternating current. The efficiency of such converters is greatly dependent on the internal resistance and capacitance of the power source, i.e., the efficiency generally increases with decreasing internal resistance and increasing internal capacitance. Since the separator-reservoir member of the present invention is electrically conductive, it both decreases the A-C resistance and increases the capacitance of the cell, thus permitting much greater power outputs in alternating current devices than is possible without the use of such a member.

Since the inventive cells can be operated in any position, they are ideally suited for many different space applications where zero gravity conditions may be encountered. Even if an electrode splits or breaks, the electrolyte is retained in the porous separators and does not escape into the gas streams.

The present invention is useful not only in fuel cells employing gaseous fuels such as hydrogen, but also in cells utilizing liquid fuels such as alcohols. Since such organic liquids tend to leak across the electrolyte and attack the wetproofing on the cathode, the operation of such a cell is substantially improved by using the subject separator-reservoir member to prevent such cross-leakage. This feature is particularly useful in cells in which useful chemical products are produced as well as electrical power; the chemical products formed at the cathode and anode can be kept physically separated and removed without contamination.

The invention is also very useful in regenerative fuel cell systems, such as $H_2$/carbon—($H_2SO_4$+HBr)—$O_2$/carbon or a $H_2$/carbon—($H_2SO_4$+$NHO_3$)—$O_2$/carbon system. The conductive separator-reservoir member can be used to prevent dissolved bromine or $NO_2$ gas produced at the oxygen electrode, both of which are harmful to the hydrogen electrode, from contacting the hydrogen electrode. In this case, the separator-reservoir member is preferably made of graphite.

While various specific forms of the present invention have been illustrated and described herein in some detail, it will be apparent that the same are susceptible of numerous modifications within the scope of this invention. For example, although the invention has been described with particular reference to cells wherein the entire electrolyte is contained within the porous conductive and non-conductive members, the conductive separator-reservoir member can also be utilized in a cell wherein only a portion of the liquid electrolyte is contained within the porous member. In such a case, the separator-reservoir member can be electronically insulated from the electrodes by the liquid electrolyte rather than by porous nonconductive separators.

What is claimed is:

1. In a fuel cell having a liquid electrolyte and two electrodes for electrochemically reacting a fuel and an oxidant, (1) a reservoir containing said electrolyte, (2) a porous gas impermeable, ion-permeable, electrically conductive separator-reservoir member disposed between said electrodes and electronically insulated from at least one of said electrodes by solid, ion-permeable separator-insulator means, and (3) one end portion of said separator-reservoir member being in direct contact with electrolyte in said reservoir to supply electrolyte to said separator-reservoir member by capillary action, and the surfaces of said electrodes being free from direct contact with electrolyte in said reservoir.

2. The fuel cell of claim 1 wherein said separator-reservoir member has a porosity of between about 30 percent and about 80 percent.

3. The fuel cell of claim 1 wherein said separator-reservoir member has a porosity of between about 60 percent and about 70 percent.

4. The fuel cell of claim 1 wherein said separator-reservoir member has a pore size of between about 0.1 micron and 10 microns.

5. The fuel cell of claim 1 wherein said separator-reservoir member is nickel.

6. The fuel cell of claim 1 wherein said separator-reservoir member is graphite.

7. The fuel cell of claim 1 wherein said separator-reservoir member is resistant to said electrolyte.

8. The fuel cell of claim 1 wherein said conductive separator-reservoir member is structurally coherent.

9. The fuel cell of claim 1 wherein said porous separator-reservoir member has an interconnecting pore structure.

10. In a fuel cell for electrochemically reacting a fuel and an oxidant and having a liquid electrolyte and two spaced apart electrodes having opposed surfaces: (1) a reservoir containing said electrolyte, (2) two absorbent non-conductive separating means each of which is in contact with one of said opposed electrode surfaces, (3) a porous gas-impermeable, ion-permeable electrically conductive separator-reservoir member disposed between and in contact with said separating means, and (4) one end of said separator-reservoir member being in direct contact with electrolyte in said reservoir to supply electrolyte to said separator-reservoir member by capillary action, and the surfaces of said electrodes being free from direct contact with electrolyte in said reservoir.

11. The fuel cell of claim 10 wherein said nonconductive separating means are woven nylon.

12. In a fuel cell for electrochemically reacting a fuel and an oxidant and having a liquid electrolyte and two spaced apart electrodes having opposed surfaces: (1) a reservoir containing said electrolyte, (2) two porous gas-impermeable, ion-permeable electrically conductive separator-reservoir members each of which is in contact with one of said opposed electrode surfaces, (3) an absorbent nonconductive separating means disposed between and in contact with said separator-reservoir members, and (4) one end of each of said separator-reservoir members being in direct contact with electrolyte in said reservoir to supply electrolyte to said separator-reservoir members by capillary action, and the surfaces of said electrodes being free from direct contact with electrolyte in said reservoir.

13. In a fuel cell having a liquid electrolyte and two electrodes for electrochemically reacting a fuel and an oxidant, (1) a reservoir containing said electrolyte, (2) a porous, gas impermeable, ion permeable, electrically conductive separator-reservoir member disposed between said electrodes and electronically insulated from at least one of said electrodes by separator-insulator means, and (3) said member being in direct contact with electrolyte in said reservoir and said separator-insulator means being free from direct contact with electrolyte in said reservoir.

References Cited
UNITED STATES PATENTS

| | | | |
|---|---|---|---|
| 2,901,523 | 8/1959 | Justi et al. | 136—86 |
| 2,903,497 | 9/1959 | Comanor | 136—146 X |
| 3,115,427 | 12/1963 | Rightmire | 136—86 |
| 3,230,114 | 1/1966 | Friese et al. | 136—86 |
| 3,005,943 | 10/1961 | Jaffe | 136—86 X |
| 3,202,547 | 8/1965 | Rightmire et al. | 136—86 |

ALLEN B. CURTIS, *Primary Examiner.*

WINSTON A. DOUGLAS, *Examiner.*